DEVICE FOR LOADING ELECTRONIC PACKAGES ON PLUGS

Filed Oct. 23, 1965

3 Sheets-Sheet 1

INVENTOR.
Claus P J. Suverkropp

BY

[signature]

Attorneys

Feb. 6, 1968 C. P. J. SUVERKROPP 3,367,014

DEVICE FOR LOADING ELECTRONIC PACKAGES ON PLUGS

Filed Oct. 23, 1965 3 Sheets-Sheet 2

INVENTOR.
Claus P. J. Suverkropp

BY

Attorneys

DEVICE FOR LOADING ELECTRONIC PACKAGES ON PLUGS

Filed Oct. 23, 1965 3 Sheets-Sheet 3

INVENTOR.
Claus P. J. Suverkropp
BY
Attorneys 3,367,014

DEVICE FOR LOADING ELECTRONIC PACKAGES ON PLUGS

Claus P. J. Suverkropp, Sunnyvale, Calif., assignor to Signetics Corporation, Sunnyvale, Calif., a corporation of California Filed Oct. 23, 1965, Ser. No. 503,045
17 Claims. (Cl. 29—206)

ABSTRACT OF THE DISCLOSURE

Device for loading electronic packages on plugs for later removal having means for spacing the leads on the electronic packages before they are placed on the plug.

This invention relates to a device for loading electronic packages on plugs and more particularly to a device for loading electronic packages such as the TO-5 package on plugs.

In copending application Ser. No. 503,513, filed Oct. 22, 1965, now patent No. 3,325,772 there is described a plug upon which electronic packages can be mounted. However, it has been found that it is very laborious and time consuming to mount the electronic packages by hand upon the plugs. There is, therefore, a need for a device which can be utilized to facilitate the loading of electronic packages on such plugs.

In general, it is an object of the present invention to provide a device for loading electronic packages on plugs in an expeditious manner.

Another object of the invention is to provide a device of the above character which is relatively simple to operate.

Another object of the invention is to provide a device of the above character which will load such electronic packages even though the leads are not completely straight.

Another object of the invention is to provide a device of the above character which is relatively simple in construction.

Additional objects and features of the invention will appear from the following description in which the preferred embodiment is set forth in detail in conjunction with the accompanying drawings.

Referring to the drawings.

Figures 1, 4:
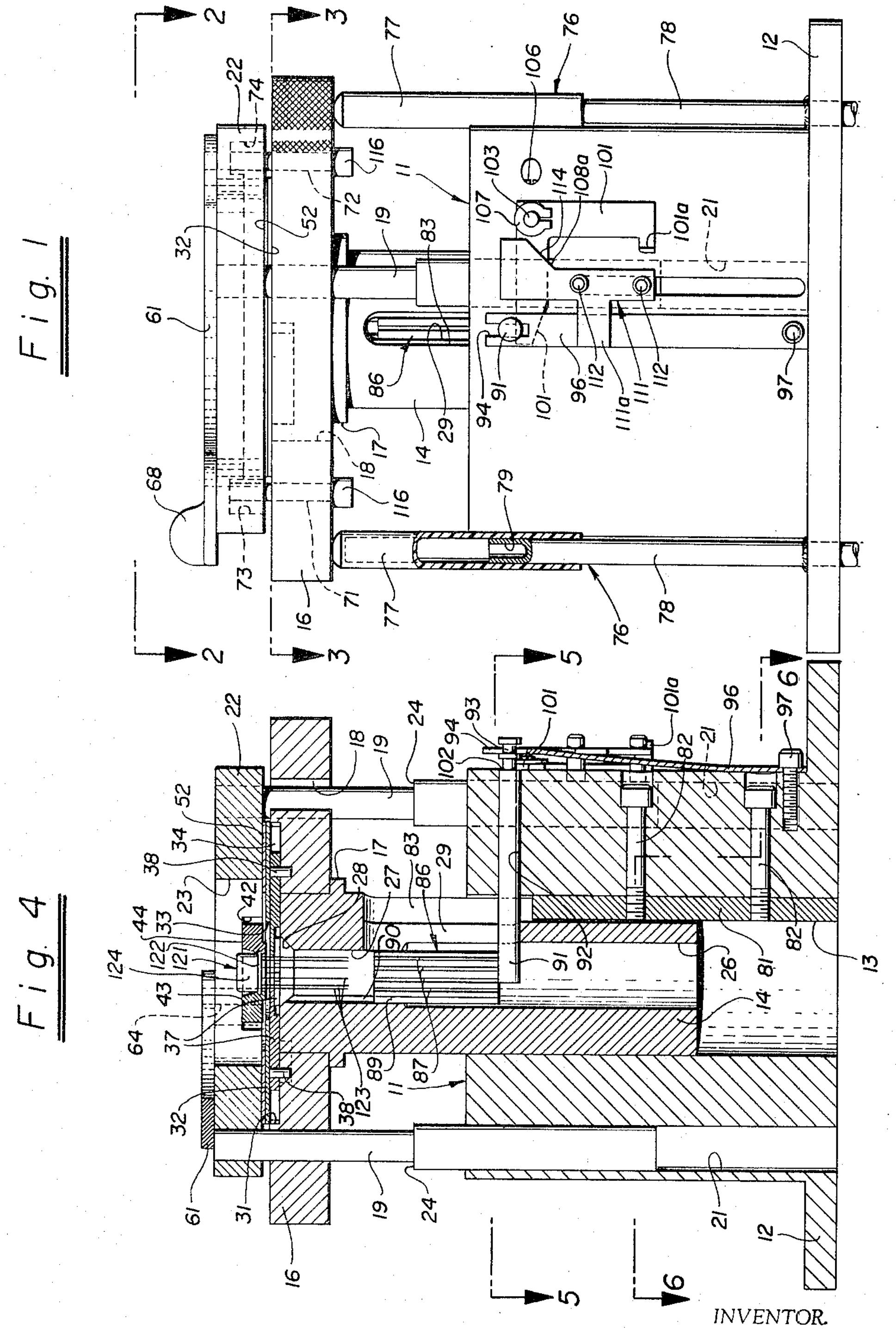
FIGURE 1 is a side elevational view of a device for loading electronic packages on plugs incorporating the present invention.
FIGURE 4 is a cross-sectional view taken along the line 4—4 of FIGURE 2.
Figure 3:
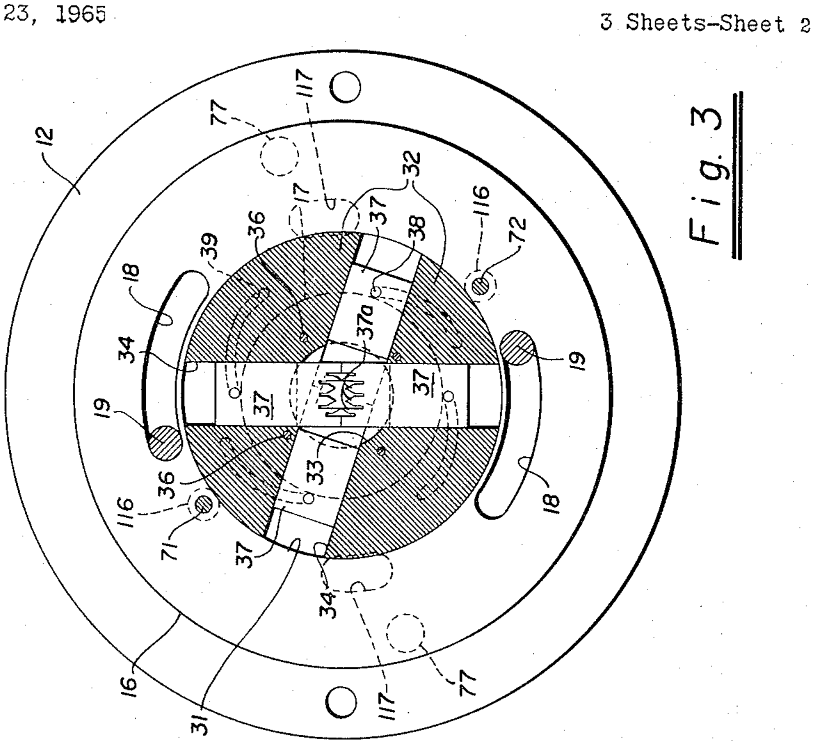
FIGURE 3 is a cross-sectional view taken along the line 3—3 of FIGURE 1.

More particularly, as shown in the drawings, the device for loading electronic packages on plugs consists of a cylindrical body or base 11 which is provided with a mounting flange 12. The base 11 is provided with a central bore 13 extending longitudinally of the body in which a locating or positioning sleeve 14 is slidably mounted.

A cam ring 16 is mounted with a slip fit upon the outer or upper end of the sleeve 14 and rests upon a shoulder 17 provided on the sleeve 14. The ring 16 is provided with arcuate slots 18 to accommodate pins 19 slidably mounted in bores 21 provided in the base 11.

The upper or outer ends of the pins 19 are secured to a pin holding ring 22. The pin holding ring 22 is provided with a large central opening 23 overlying the upper end of the sleeve 14. The pins 19 are provided with shoulders 24 for a purpose hereinafter described.

The sleeve 14 is provided with a bore 26 extending longitudinally thereof opening into the bottom end. A smaller bore 27 extends longitudinally of the bore and is in communication with the bore 26. The upper end of the sleeve 14 is provided with a chamfer 28. The sleeve 14 is also provided with a slot 29 which opens into the bores 26 and 27 in the sleeve.

The cam ring 16 is provided with a centrally disposed circular recess 31. A circular slide plate 32 is disposed within the recess 31. It is provided with a central opening 33 and four separate ways 34. The ways are aligned in pairs with the axes of the pairs of ways being separated by 72° to accommodate the particular lead arrangement being utilized on the electronic package. The slide plate 32 has its inner margin secured to the sleeve 14 by suitable means such as screws 36. A plurality of jaws 37, namely, four jaws, are slidably mounted in the ways 34 of the slide plate 32. As will be noted from FIGURE 4 of the drawings, the jaws 37 are substantially L-shaped in cross-section with their inner portions being of substantially less thickness than the remaining portion of the jaws. Thus, the four separate jaws can act in pairs in which the inner portions of one pair overlap the inner portions of the other pair. The jaws 37 are provided with teeth-like portions 37*a* which are adapted to engage the leads of the package as hereinafter described. The jaws 37 are provided with downwardly depending dowel pins 38 which extend into cam slots 39 provided in the cam ring 16. It will be noted that each of the cam slots 39 is provided with a relatively short end portion 39*a* which extends in a direction different from the main portion of the arcuate slot. The cam slots 39 are formed in the cam ring 16. Thus, it can be seen that the jaws 37 are held in the desired positions by the cooperation of the cam ring 16 and the slide plate 32.

The under side of the ring 22 is provided with a relatively wide, diametrically extending jaw-receiving recess 42. A pair of jaw members 43 and 44 are mounted side by side within recess 42. The jaw member 43 is pivotally mounted upon a pin 46, whereas the jaw member 44 is pivotally mounted upon a pivot pin 47. The pivot pins 46 and 47 are mounted on the pin holding ring 22. The jaw members 43 and 44 are provided with package engaging arcuate jaw portions 43*a* and 44*a*, respectively. Adjacent arcuate cut-outs 48 are provided on each of the members to provide additional space for the electronic package to be grasped between the jaw members 43 and 44. The jaw members 43 and 44 are normally and yieldably urged into a position in which the jaw portions 43*a* and 44*a* are urged towards each other by suitable means such as springs 49 provided in wells 51 in the pin holding ring 22. A circular jaw retaining plate 52 which is provided with a central opening 53 is secured to the bottom side of the pin holding ring 22 by suitable means such as screws 54 threaded into the pin holding ring 22. As can be seen from FIGURE 4, the jaw members 43 and 44 are provided with chamfers 56 in an arcuate recess 57 so that the electronic package can be readily loaded into the jaw members 43 and 44 by pressing the same over the chamfers 56 into the recesses 57.

Figure 2:
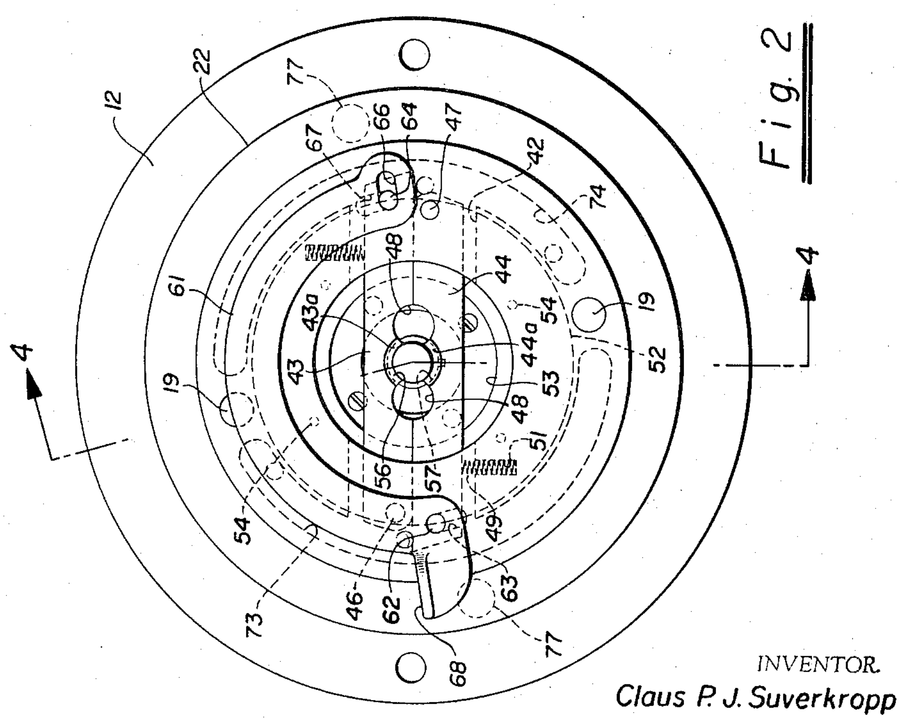
FIGURE 2 is a top plan view of the device shown in FIGURE 1.

Means is provided for manually opening the jaw members 43 and 44 to permit a package to be removed therefrom when desired and consists of a substantially semi-circular opening member 61. The opening member 61 is pivotally mounted upon a pin 62 which extends through a slot 63 provided in the pin holding ring 22. The pin is secured to one end of the jaw member 44. The other end of the semi-circular opening member 61 is provided with a slot 64 which accommodates a pin 66 extending through a slot 67 provided in the pin holding ring 22. The pin 66 is mounted in one end of the jaw member 43 and opposite the pivot pin 46. The opening member 61 is provided with a thumb grip 68 to facilitate operation of the same. Thus, it can be seen that by grasping the thumb grip 68 and shifting the thumb grip in a counter-clockwise direction as viewed in FIGURE 2, the jaw members 43 and 44 can be moved to an open position. As soon as the opening member 61 is released, the springs 51 will return the jaw members 43 and 44 to their normally closed position.

Additional means is provided for opening the jaw members 43 and 44 and consists of header jaw actuating pins 71 and 72 which are threaded into the cam ring 16 and extend upwardly therefrom into substantially semicircular elongate arcuate slots 73 and 74 provided in the underside of the pin holding ring 22. It will be noted that the pins 71 and 72 extend to such a height that they are above the jaw members 43 and 44 so that they will be actuated as hereinafter described.

Means is provided for raising the sleeve 14, the cam ring 16 mounted thereon and the other parts mounted above the cam ring and consists of suitable fluid-operated means such as air-operated actuators 76 comprising a movable cylinder 77 and a stationary piston 78 which is mounted in the flange 12. The piston 78 is provided with a passage 79 through which the fluid such as air is introduced to raise the sleeve 14 and the cam ring 16 and other associated parts and hold them in the raised position.

The sleeve 14 is prevented from rotating within the body 11 by suitable means such as a key 81 which is held in place in the bore 13 in the body 11 by suitable means such as cap screws 82. The key 81 is seated in a way 83 provided in the sleeve 14.

Figure 5:
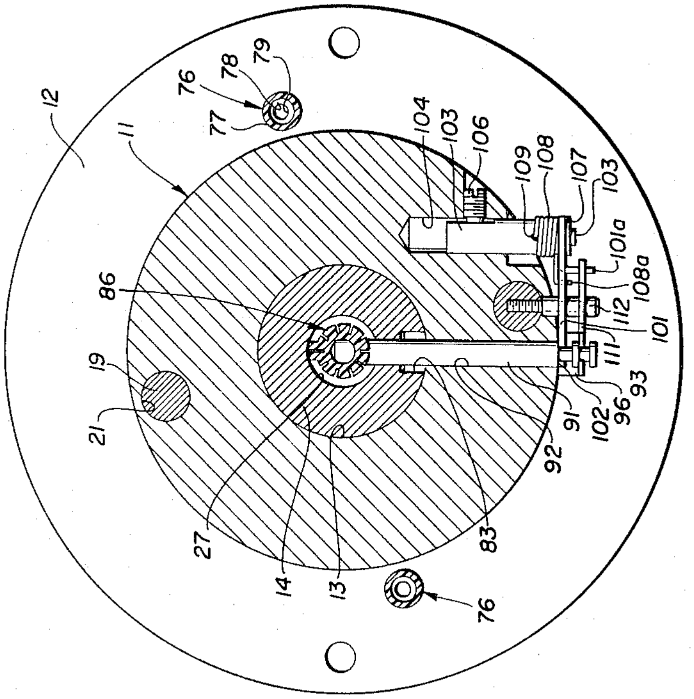
FIGURE 5 is a cross-sectional view taken along the line 5—5 of FIGURE 4.
Figure 6:
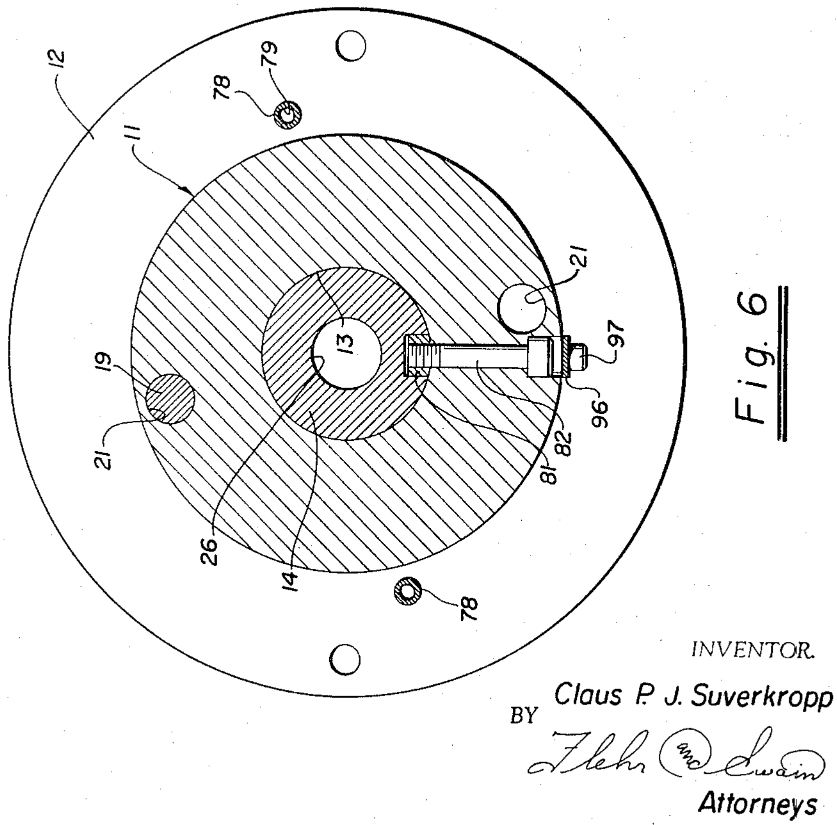
FIGURE 6 is a cross-sectional view taken along the line 6—6 of FIGURE 4.

The sleeve 14 is adapted to receive a plug 86 which is shown in FIGURES 4 and 5 as substantially in the form of a right cylinder. It is provided with a plurality of equally spaced, outwardly facing recesses 87 extending the length thereof. The plug is also provided with a central bore 88 and a key 89, which has one of the recesses 87 disposed therein. The key 89 is adapted to be aligned with a keyway 90 in the sleeve 14.

Means is provided for holding the plug 86 in the desired position during loading of the electronic package thereon and for releasing the same after the loading has been completed and consists of a holding pin 91 slidably mounted in a bore 92 provided in the body 11. The pin extends through the body 11 at right angles to the axis of the bore 13 and extends through the way 83 and through the slot 29 provided in the sleeve. The holding pin 91 is provided with a recess 93 adjacent its outer end to permit the holding pin 91 to be received in an open-ended slot 94 formed in one end of a latch spring 96. The other end of the latch spring 96 is secured to the block 11 by suitable means such as a cap screw 97. A latch arm 101 is provided to prevent the latch spring 96 from moving the holding pin 91 into a position to release the plug 86 until an appropriate time. This latch arm engages a shoulder 102 provided on the holding pin 91. The latch arm 101 is pivotally mounted upon a pin 103 mounted in a bore 104 in the body 11. The pin 103 is retained in a desired position by a set screw 106. The latch arm 101 is retained upon the pin 103 by a Tru-arc ring 107. Means is mounted upon the pin 103 and engages the latch arm 101 to yieldably urge the latch arm into engagement with the holding pin 91 and consists of a coil spring 108 which has one end engaging the pin 103 in a hole 109 and has the other end 108*a* engaging the underside of the latch arm 101. The latch arm 101 is provided with an outstanding ear 101*a* for a purpose hereinafter described.

A cam plate 111 is provided with an ear 111*a* which overlies the spring 96. The cam plate 111 is secured to the guide post 19 by screws 112. It is also provided with a cam surface 114 which, when the guide pins 19 are moved downwardly, is adapted to engage the outsstanding portion 101*a* of the latch arm 101 to cam the latch arm 101 in a counter-clockwise direction as viewed in FIGURE 1 to release the holding pin 91 and to permit it to be withdrawn by the force of the spring 96.

The pins 71 and 72 are provided with buttons 116 which are adapted to be received by slots 117 formed in the body 11 for a purpose hereinafter described.

Operation of the device for loading electronic packages on plugs may now be briefly described as follows. Let it be assumed that the parts are in the position shown in the drawings with the exception that the plug 86 is not in place and that the package 121 is not in place. The jaw members 43 and 44 are first opened either by first rotating the cam ring 16 in a counterclockkwise direction to cause the pins 71 and 72 to strike the jaw members 43 and 44 and to thereby open the jaw members 43 and 44, or by actually operating the opening member 61 by engaging the thumb grip 68 to open the jaw members 43 and 44.

While the jaw members 43 and 44 are in an open position, the plug 86 is aligned with the keyway 90 provided in the sleeve 14 and is then dropped into the sleeve 14 to fall through the bore 27 until it engages the holding pin 91. The jaw members 43 and 44 are then permitted to close either by rotating the cam ring 16 in a clockwise direction, or by releasing the thumb grip 68 to permit the springs 51 to move the jaw members to a closed position. As soon as this has been completed, the electronic package 121 is placed in the device. The electronic package 121 is of a conventional type, namely, a TO-5 package which is provided with a header 122 having leads 123 depending therefrom. It also has an electronic device (not shown) mounted upon the header and connected to the leads. A cap 124 is mounted on the header and serves to enclose the electronic device. The electronic package is inserted into the device with the leads extending downwardly and pressed through the jaw members 43 and 44 so that the header 122 snaps into the jaw members. The jaw member 44 is provided with a keyway 45 which is adapted to receive the key (not shown) of the electronic package so that the electronic package is properly oriented within the device and with respect to the plug 86 on which it is to be mounted. The electronic package 121 is held by the jaw members 43 and 44 in a position with respect to the plug 86 as shown in FIGURE 4.

As soon as the above identified operation has been completed, the cam ring 16 is rotated in a clockwise direction to cause the jaws 37 to be moved inwardly and to engage and hold the leads 123 of the electronic package to properly orient the same. The jaws 37 are moved inwardly by the dowel pins 38 travelling in the cam slots 39. The jaws 37 with their intersecting jaw portions serve to hold the leads 123 in the desired spacing. As soon as the jaws 37 have been moved into engagement with the leads, the air pressure on the actuators 76 is released and the cam ring 16 is engaged by the hands of the operator and pushed downwardly with the sleeve 14 to cause the jaws 37 to move downwardly on the leads 123 while the package 121 is held stationary by the jaw members 43 and 44 and the pin holding ring 22. This ensures that the leads 123 will have the same spacing as the recesses 87 provided in the plug 86 before they are moved into the recesses. As soon as the cam ring 16 engages the shoulders 24 provided on the guide pins 19, the guide pins 19 are moved downwardly together with the pin holding ring 22 causing the package 121 to move the leads 123 into the recesses 87 of the plug 86. This movement continues until the buttons 116 provided on the ends of the pins 71 and 72 engage the top of the body 11. When this occurs, the outer extremities of the leads 123 of the package are just disposed within the recesses 87 of the plug 86. As soon as the buttons 116 provided on the ends of pins 71 and 72 engage the top of the body 11, the pin holding ring 22 is engaged by the hands of the operator and pushed downwardly until the retaining plate 52 carried by ring 22 engages the slide plate 32 and is stopped by it. When this occurs, the leads 123 of the package are almost completely disposed in the recesses of the plug 86.

When the leads are in this position on the plug, the cam ring 16 is rotated in a clockwise direction to open the jaws 37 to release the leads 123. This rotation is continued until the buttons 116 drop into the slots 117 provided on the top of the body 11. As soon as the buttons 116 drop into the slots 117, the remaining portions of the leads 123 are pushed down onto the plug 86 and into the recesses 87. At the same time, the surface 114 of the cam plate 111 is moved into engagement with the upstanding ear 101*a* provided on the latch arm 101 to release the pin 91 so that it is moved outwardly under the force of the spring 96 so that the pin 91 no longer supports the plug 86. Further clockwise rotation of the cam ring 16 causes the pins 71 and 72 to strike the jaw members 43 and 44 to cause them to release the electronic package and to permit the same to drop downwardly through the bore 26 in the sleeve 14 and through the bore 13 in the body 11 to a suitable receptacle (not shown).

Thereafter, air is supplied to the actuator 76 to again raise the cam ring 16 in the other parts together with the sleeve 14. As the guide pin 19 is raised, the portion 111*a* on the cam plate 111 moves the upper end of the spring 96 together with the holding pin 91 inwardly until it is engaged by the latch arm 101 which is yieldably urged upwardly into engagement with the pin 91 by the spring 108. The device is now in a position to receive the plug and an electronic package as hereinbefore described.

Thus, it can be seen that the device can be utilized for quickly and easily mounting electronic packages on plugs even though the electronic packages may have a relatively large number of leads. The device is constructed in such a manner so that it is simple to operate and so that it can be operated by women.

I claim:

1. In a device for loading electronic packages having a plurality of leads on plugs, a body, a sleeve slidably mounted in the body, said sleeve having a central bore therein having a length greater than the plug and adapted to receive a plug, means mounted on the body for holding the plug in the bore in the sleeve and so that the plug is disposed completely within said sleeve, means mounted on the sleeve adapted to carry the electronic package so that the leads of the electronic package extend downwardly into the bore of the sleeve, and means for causing relative movement between the plug and the sleeve so that the leads of the electronic package are forced onto the plug while the plug is disposed completely within the sleeve and are thereafter carried by the plug.

2. A device as in claim 1 together with means for engaging the leads of the electronic package before the leads are moved into engagement with the plug.

3. A device as in claim 1 together with jaws, and means for moving the jaws between open and closed positions, said jaws in the closed position engaging the leads and serving to provide the leads with a predetermined spacing corresponding to the spacing of the recesses in the plug.

4. In a device for loading electronic packages having a plurality of leads on plugs having a plurality of spaced recesses, a body, a sleeve slidably mounted in said body, said sleeve having a bore therein having a length greater than the length of the plug and adapted to receive a plug, means mounted on the body and adapted to extend into the bore in the sleeve for holding the plug in a predetermined position in the bore in the sleeve, means mounted on the body and adapted to carry the electronic package so that the leads of the electronic package extend downwardly into the bore of the sleeve, jaw means mounted on the sleeve and adapted to be moved into engagement with the leads of the electronic package disposed in the bore in the sleeve, said jaw means and said sleeve being movable relative to said leads whereby said jaw means serves to space said leads in accordance with the spacing of the recesses in the body and means for causing relative movement between the means for holding the electronic package and the plug whereby said leads are moved into the recesses in the plug.

5. A device as in claim 4 wherein said jaw means includes means for moving the jaw means to an out-of-the-way position after portions of the leads are disposed in the recesses in the plugs.

6. A device as in claim 4 together with means operated by said means permitting relative movement between the plug and the means carrying the electronic package for causing said means supporting the plug in the bore to be moved to an out-of-the-way position to permit the plug with the package mounted therein to pass through the bore.

7. A device as in claim 5 wherein said means for causing said jaws to move out of engagement with said leads includes means for causing said means for holding the electronic package to release the electronic package.

8. In a device for loading electronic packages having a plurality of leads on plugs having a plurality of spaced recesses, a body having a large bore therein, a sleeve slidably mounted in the bore in the body, said sleeve having a bore extending longitudinally thereof and adapted to receive a plug, said sleeve having a slot therein opening into said bore in said sleeve, pin means slidably mounted in said body and extending through said slot in said sleeve into the bore in said sleeve and adapted to support a plug in a predetermined position in the bore in the sleeve, guide rod means slidably mounted in the body, a cam ring rotatably mounted on said sleeve and slidably mounted on said guide rod means, a member secured to the ends of said guide rod means, means carried by said member supported by said guide rod means for holding an electronic package with its leads extending into the bore in the sleeve, jaw means carried by the cam ring and movable into a position in engagement with the leads extending into the bore in the sleeve for spacing the leads of the electronic package so that the spacing corresponds to the spacing of the recesses in the plugs, said cam ring and the jaw means carried thereby and the sleeve being movable longitudinally of the leads, said member carried by said guide rod means being movable to position the leads of the electronic package upon the recesses in the plug, and means operated by said guide rod means for releasing the means for holding the plug in a predetermined position in the sleeve when the guide rod means has been moved to a predetermined position to permit the plug with the electronic package thereon to be released and travel through the bore and the sleeve.

9. A device as in claim 8 wherein said cam ring is rotatable on said sleeve to cause said jaw means to be moved into a position out of engagement with said leads.

10. A device as in claim 8 wherein said jaw means consists of a plurality jaws and means connecting said jaws to said cam ring whereby as said cam ring is rotated in opposite directions said jaws are moved between open and closed positions.

11. A device as in claim 8 wherein said means carried by the member attached to the guide rods includes jaw means for engaging the electronic device and means carried by said member for moving said jaw means between open and closed positions.

12. A device as in claim 11 together with means for causing said last named jaw means to move to an open position when said cam ring is rotated beyond a predetermined angular position.

13. A device as in claim 8 wherein said means for causing said plug to be released includes a pin slidably mounted in said body and extending into the bore in said sleeve, spring means secured to said pin in said body for yieldably moving said pin out of said bore, latch means mounted on the body for engaging said pin and normally retaining said pin in the bore in said sleeve and means carried by the guide rod means for releasing said latch means when said guide rod means has been moved on a predetermined position.

14. A device as in claim 13 together with means carried by the guide rod means for returning said pin into a position in the bore in said sleeve against the force of the yieldable means.

15. A device as in claim 8 together with arcuate slots disposed in said body and spacer means carried by said cam ring and adapted to seat in said slots in said body in a predetermined angular position of said cam ring with respect to said body.

16. A device as in claim 8 wherein said guide rod means includes a pair of rods slidably mounted in said body, said rods having shoulders intermediate the ends thereof adapted to be engaged by said cam ring.

17. In a device for loading electronic packages having a plurality of leads in excess of three on plugs having a plurality of spaced recesses for later removal, a body, means mounted in the body for retaining the package so that the leads of the package are substantially free, lead engaging means mounted on the body and having a lead engaging element for each lead, said lead engaging elements being spaced in accordance with the desired spacing for the leads, means including a cam mounted on the body for causing the lead engaging means with the lead engaging elements to move in a direction at substantially right angles to the leads into engagement with portions of the leads to position said portions in accordance with the desired spacing for the leads, and means carried by the body for causing relative movement between the lead engaging means and the leads of the electronic package longitudinally of the leads to cause all portions of the leads to be spaced in accordance with the desired spacing provided by the lead engaging elements.

References Cited

UNITED STATES PATENTS

| | | | |
|---|---|---|---|
| 3,067,495 | 12/1962 | Chase | 29—203 |
| 3,130,485 | 4/1964 | Preuss | 29—203 |
| 3,151,387 | 10/1964 | Clemens et al. | 29—203 |
| 3,226,810 | 1/1966 | Boliveau | 29—203 |

THOMAS H. EAGER, *Primary Examiner.*